(12) United States Patent
Benoit et al.

(10) Patent No.: US 8,141,364 B2
(45) Date of Patent: *Mar. 27, 2012

(54) BRAZED JOINT BETWEEN A METAL PART AND A CERAMIC PART

(75) Inventors: Joël Michel Daniel Benoit, Cesson la Foret (FR); Jean-François Fromentin, Cesson la Foret (FR); Olivier Gillia, Sassenage (FR); Pascal Revirand, Saint Egreve (FR)

(73) Assignees: SNECMA, Paris (FR); Commissariat a l'Energie Atomique, Paris (FR)

( * ) Notice: Subject to any disclaimer, the term of this patent is extended or adjusted under 35 U.S.C. 154(b) by 696 days.

This patent is subject to a terminal disclaimer.

(21) Appl. No.: 12/096,714

(22) PCT Filed: Dec. 8, 2006

(86) PCT No.: PCT/FR2006/051319
§ 371 (c)(1),
(2), (4) Date: Aug. 15, 2008

(87) PCT Pub. No.: WO2007/066053
PCT Pub. Date: Jun. 14, 2007

(65) Prior Publication Data
US 2008/0307793 A1 Dec. 18, 2008

(30) Foreign Application Priority Data
Dec. 8, 2005 (FR) ...................................... 05 53793

(51) Int. Cl.
*F02C 1/00* (2006.01)
*F16C 9/00* (2006.01)
*B64C 11/24* (2006.01)
*B23P 15/04* (2006.01)

(52) U.S. Cl. ........... 60/753; 403/29; 403/30; 416/241 B; 29/889.2

(58) Field of Classification Search ............... 60/770, 60/771, 753; 239/265.19, 265.39; 415/200, 415/148, 150; 428/57
See application file for complete search history.

(56) References Cited

U.S. PATENT DOCUMENTS
4,281,941 A * 8/1981 Rottenkolber .................. 403/29
(Continued)

FOREIGN PATENT DOCUMENTS
EP 0 480 470 4/1992
(Continued)

OTHER PUBLICATIONS
Office Action issued Nov. 29, 2010 in Russia Application No. 2008127506, filed Dec. 8, 2006 (With English Translation).
(Continued)

*Primary Examiner* — Ehud Gartenberg
*Assistant Examiner* — Arun Goyal
(74) *Attorney, Agent, or Firm* — Oblon, Spivak, McClelland, Maier & Neustadt, L.L.P.

(57) ABSTRACT

An assembly including a metal piece, a piece made of ceramic material, and at least one intermediate connection element assembled to each of the pieces by brazing. The intermediate connection element includes a deformable sheet presenting at least two flat zones brazed to respective ones of the pieces, the two flat zones being interconnected by a deformable zone presenting at least two free undulations oriented in alternation towards the metal piece and towards the piece made of ceramic material.

19 Claims, 5 Drawing Sheets

U.S. PATENT DOCUMENTS

| | | | |
|---|---|---|---|
| 4,410,285 A | | 10/1983 | Strasser et al. |
| 4,723,862 A | | 2/1988 | Ito et al. |
| 5,501,390 A | | 3/1996 | Allen et al. |
| 5,713,522 A | * | 2/1998 | Lundberg ................ 239/265.39 |
| 6,758,386 B2 | * | 7/2004 | Marshall et al. ............... 228/120 |
| 7,891,073 B2 | * | 2/2011 | Blanchard et al. ......... 29/525.01 |
| 2007/0240423 A1 | * | 10/2007 | Bulman et al. .................. 60/753 |

FOREIGN PATENT DOCUMENTS

| | | |
|---|---|---|
| JP | 59 156976 | 9/1984 |
| WO | WO 2007/066052 A2 | 6/2007 |

OTHER PUBLICATIONS

U.S. Appl. No. 12/096,663, filed Jun. 9, 2008, Benoit, et al.

U.S. Appl. No. 12/096,489, filed Jun. 6, 2008, Benoit, et al.

* cited by examiner

BRAZED JOINT BETWEEN A METAL PART AND A CERAMIC PART

BACKGROUND OF THE INVENTION

The present invention relates to the general field of brazing together two materials that present different thermomechanical properties.

More precisely, the invention applies to brazing together a metal piece and a piece made of ceramic material, e.g. based on silicon carbide (SiC) and/or carbon.

The piece made of ceramic material may be constituted by solid silicon carbide. It may also be constituted by a thermostructural composite, and in particular by a ceramic matrix composite (CMC) reinforced by silicon carbide or carbon fibers.

Thermostructural composite materials are characterized by mechanical properties that make them suitable for constituting structural parts, while also conserving these mechanical properties at high temperatures. They are constituted by fiber reinforcement densified by a matrix of refractory material that fills in the pores of the fiber reinforcement, at least in part. The choice of materials for the fibers and for the ceramic is typically made amongst carbon and ceramics (i.e. materials that are neither metallic nor organic), and in particular silicon carbide (SiC).

By way of example, the invention can be used for assembling together a piece made of ceramic material with a metal piece made of an alloy of titanium, aluminum, and vanadium (TA6V) or of Inconel 718 (registered trademark), an alloy based on nickel and having the composition NiCr19Fe19Nb5Mo3.

The mechanical properties of pieces made of ceramic material and the fact that these properties are conserved at high temperature make them materials that are particularly suitable for making pieces that are subjected to high levels of thermomechanical stress, in particular in aviation applications (engine parts, fairing elements). When ceramic materials are reinforced by silicon carbide or carbon fibers, they constitute an alternative to metallic materials, presenting numerous advantages, in particular in terms of weight savings and of operational lifetime.

Conventionally, pieces made of ceramic material and metal pieces are assembled together by a mechanical connection of the riveting or bolting type, but such a connection can sometimes be unsuitable for reasons of size, difficulty of implementation, or weight.

Furthermore, known homogeneous assembly methods for use with ceramic materials and involving organic precursors of ceramics are not suitable for heterogeneous assemblies between a ceramic material and a metal.

Known brazing techniques used for making homogeneous connections between two ceramic materials can be difficult to use for heterogeneously brazing a ceramic material on a metal because of the very different thermomechanical and chemical behaviors of ceramic materials and metals.

A metal alloy based on titanium, aluminum, and vanadium presents a coefficient of expansion that is about two to three times greater than that of ceramic materials.

More precisely, the coefficient of expansion of such an alloy at 500° C. is about $10 \times 10^{-6} K^{-1} \pm 15\%$, while the coefficient for a CMC is about $2.5 \times 10^{-6} K^{-1}$ to $4.0 \times 10^{-6} K^{-1} \pm 15\%$.

Thus, for a 30 millimeter (mm) assembly, an expansion offset of 0.2 mm is observed on cooling the assembly from the solidification temperature of the brazing composition to ambient temperature.

Such an offset leads to high levels of stress appearing in the two pieces, and in particular to compression forces in zones of the brazed joint adjacent to the ceramic, and traction forces in zones adjacent to the metal piece. These stresses can give rise to local deformations that might cause one of the pieces to break or lead to reduced strength of the brazed joint.

Such deformations are irreversible in the metal piece. In the ceramic piece, in particular when made of a CMC, these deformations can lead to brittle type breakage. Such breakage can occur suddenly if the stress is too high. Breakage can also occur by damage building up successively under cyclical stressing.

OBJECT AND SUMMARY OF THE INVENTION

A main object of the present invention is thus to mitigate such drawbacks by proposing an assembly comprising a metal piece, a piece made of ceramic material, and at least one intermediate connection element assembled to each of said pieces by brazing, the intermediate connection element being constituted by a deformable sheet presenting brazed flat zones and deformable zones.

By way of example, a brazing composition of the Ag—Mn or Ag—Cu—Ti type may be selected, thus making it possible to obtain an assembly that is strong at high temperatures of as much as 500° C.

In accordance with the invention, the differential expansion between the piece made of ceramic material and the metal piece is absorbed by the deformable sheet.

The assembly thus presents thermomechanical adaptation to differential expansion, while remaining as much as possible within the elastic domain. In order to be able to withstand cooling after brazing and thermal cycling in operation, it is necessary to accommodate the differential expansion between the piece made of ceramic material and the metal piece.

In a preferred embodiment, the piece made of ceramic material is based on silicon carbide and/or carbon.

For example, the ceramic material piece is made of solid silicon carbide.

In another embodiment, the ceramic material piece comprises a ceramic matrix reinforced by silicon carbide or carbon fibers.

In a preferred embodiment, the deformable sheet includes at least two deformable undulations oriented in alternation towards the metal piece and towards the piece made of ceramic material.

Preferably, at least one of the deformable undulations is free, such a free undulation guaranteeing increased flexibility for the brazed connection.

The height of the free undulation may advantageously be used for modifying rigidity in the fold direction.

In a first variant embodiment, the deformable undulations are concentric.

In an embodiment of this first variant, the intermediate connection element comprises a first flat zone that is substantially circular about an axis, a second flat zone that is substantially annular, coaxial about the first flat zone, and having an inside diameter greater than the diameter of said first zone, and undulations presenting symmetry of revolution about the above-mentioned axis.

Because of this symmetry, such a connection element presents behavior that is identical regardless of the direction of the line of greatest stress.

In another variant embodiment the connection element is generally in the form of a concertina-folded tape.

In an advantageous embodiment of the invention, the assembly comprises a plurality of intermediate connection elements that are disposed radially around a fixed point.

With such a connection element, the stresses are low in the brazed joints and rigidity can be modulated.

Placing the intermediate connection elements in a radial star disposition advantageously presents concentric undulations that are interrupted radially (the interruptions being constituted by empty gaps along a plurality of radial directions), thus making it possible to reduce or eliminate tangential stresses from such concentric circles.

Preferably, the intermediate connection elements are arranged in a plurality of radial directions around the fixed point.

Such an embodiment enables the stiffness of the assembly between the metal piece and the piece of ceramic material to be increased.

Around the fixed point as defined above, the offset due to the expansion of the metal piece increases with distance from the fixed point.

In a particular embodiment of this configuration, the intermediate connection elements are of increasing flexibility on going away from the fixed point.

Such an embodiment serves to compensate for the above-mentioned increase in offset.

The invention also provides a turbomachine nozzle including at least one assembly as mentioned above in which the metal piece is a casing of said nozzle (or a lever), and the piece made of ceramic material is a flap of the nozzle.

The invention also seeks to provide a turbomachine combustion chamber including at least one assembly as mentioned above in which the metal piece is a casing of said chamber (or a component part thereof, or a joint—i.e. a connection element—therein), and the piece made of ceramic material is a component part of said chamber.

The invention also provides post-combustion equipment for a turbomachine including at least one assembly as mentioned above in which the metal piece is a post-combustion casing (or a platform of post-combustion equipment), and the piece made of ceramic material is a flame-holder arm.

The invention also provides a turbomachine including at least one assembly as mentioned above.

BRIEF DESCRIPTION OF THE DRAWINGS

Other characteristics and advantages of the present invention appear from the following description with reference to the accompanying drawings that show embodiments having no limiting character. In the figures.

DETAILED DESCRIPTION OF EMBODIMENTS

Figure 1:
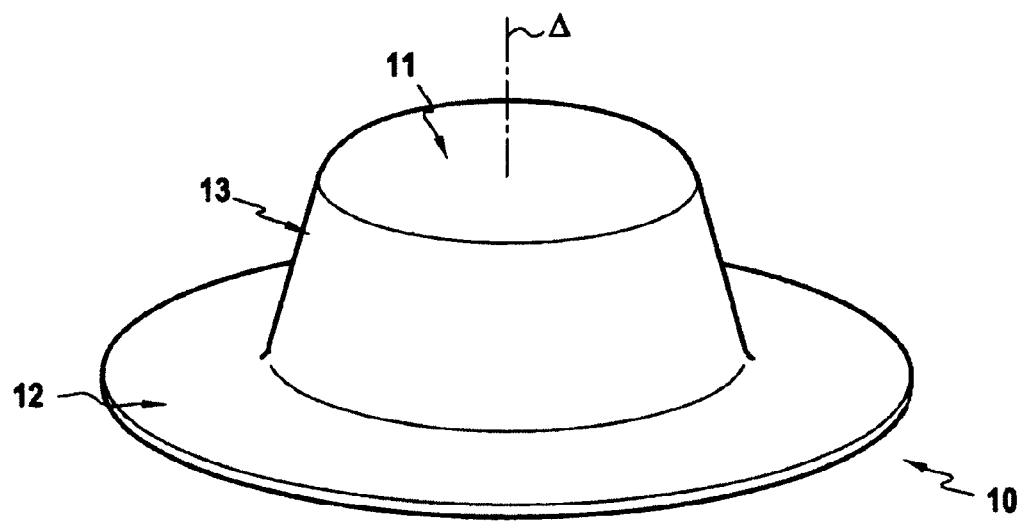
FIG. 1 shows a connection element suitable for use in a first assembly in accordance with the invention.

FIG. 1 shows a connection element 10 suitable for use in a first assembly in accordance with the invention. By way of example it is constituted by a plane deformable material stamped as to form a first flat zone 11 that is circular about an axis Δ, and a second flat zone 12 that is annular about the axis Δ, these two zones being interconnected by a deformable zone 13 forming substantially a truncated cone. The inside diameter of the annular zone 12 is greater than the diameter of the circular zone 11. The substantially conical walls 13 may present inclination to a greater or lesser extent relative to the direction perpendicular to the flat zones 11 and 12.

Figure 2:
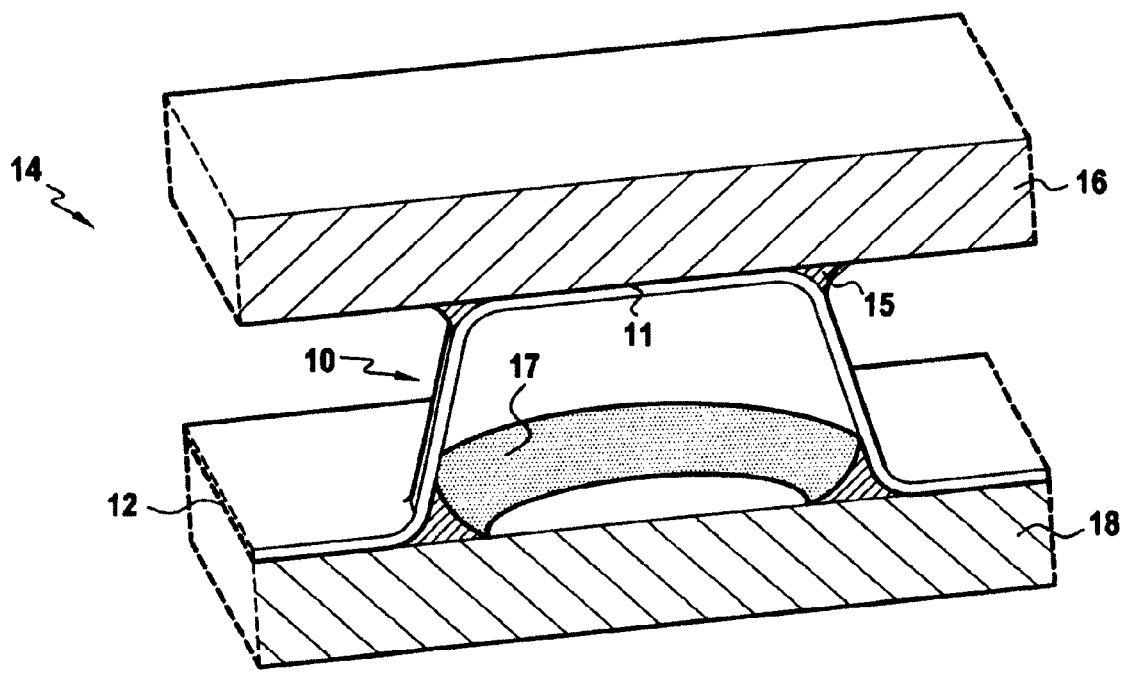
FIG. 2 is a section through an assembly of the invention using the connection piece of FIG. 1.

FIG. 2 shows a section through an assembly 14 of the invention made using a connection element 10 as shown in FIG. 1.

In this assembly, a first brazed joint 15 is made between a metal piece 16 and the circular flat zone 11 of the connection element 10. A second brazed joint 17, preferably using the same brazing composition, is made between a piece 18 of ceramic material, e.g. a CMC, and the annular flat zone 12 of the connection element 10.

The connection element 10 shown and used in FIGS. 1 and 2, can be obtained from a plate of deformable material by cutting out and stamping using a substantially cylindrical stamping element.

A vertical height or size for the connection element of about 2 mm is appropriate for aviation applications, however it will be understood that this size can be modified as a function of requirements specific to different applications. The proportions of the various portions of the connection element 10 may also be modified as a function the intended application.

On this topic, it should be observed that modifying the geometrical parameters of the connection element 10 makes it possible to modify the magnitude of the stresses observed.

The proposed size of 2 mm enables flexibility to be obtained in the tangential direction for pieces having a size of the order of about ten centimeters. Under the effect of differential expansion, for example during a thermal cycle, the conical portion 13 of the connection element 10 can absorb this expansion differential completely, or in part, without endangering the strength of the assembly. Since the material from which the connection element is made is deformable, the deformation of the cylindrical portion is of no consequence for the assembly as a whole.

Nevertheless, in the embodiment shown in FIG. 2, high levels of stress can be observed in the brazed joints and in shear in the membrane in the connection element.

The connection element 10' described below with reference to FIG. 3 serves to mitigate this drawback.

The connection element 10' has a deformable zone 13' that is axially symmetrical about an axis Δ, this zone 13' being shaped so as to comprise at least two free undulations 19 and 20 oriented alternately upwards and downwards relative to the flat zones 11 and 12 that are respectively circular and annular about the axis Δ. The structure is still advantageously made of stamped deformable material. The presence of undulations that are free, i.e. not brazed, in the deformable zone 13' makes the structure more flexible.

Figure 5:
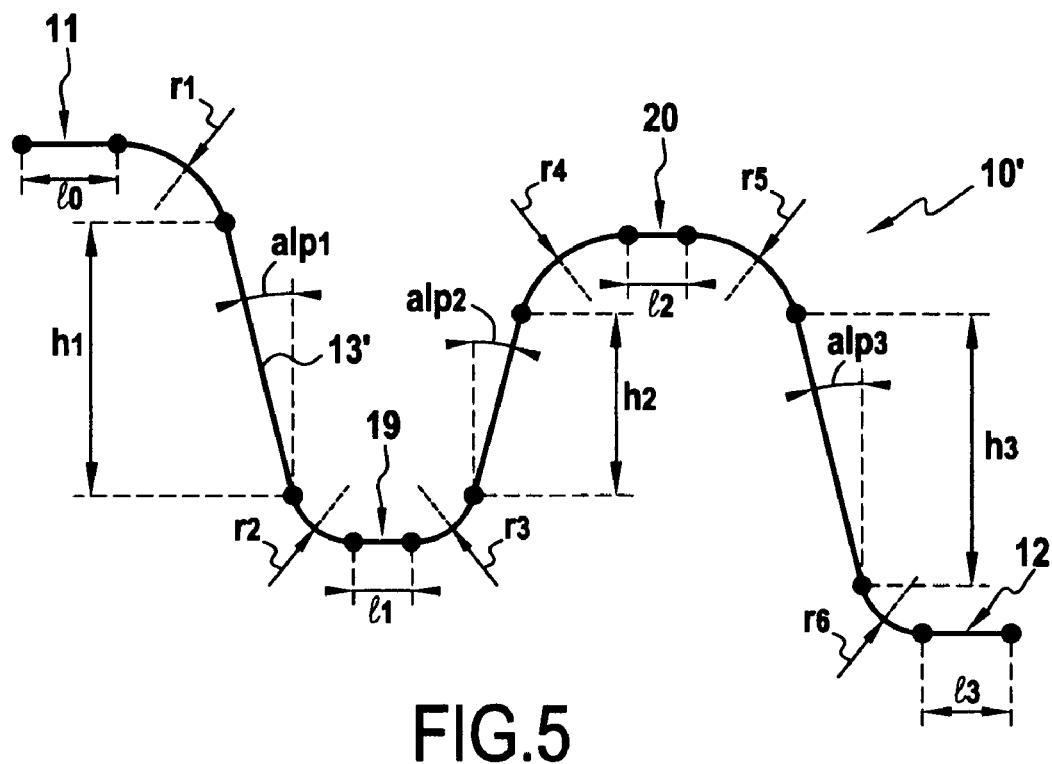
FIG. 5 is a fragmentary section through the connection element of FIGS. 3 and 4.

FIG. 5 shows a section V-V (see FIG. 3) of the connection element 10'. The flat zones 11 and 12 are interconnected by the deformable zone 13' that presents two free undulations 19 and 20.

Figure 3:
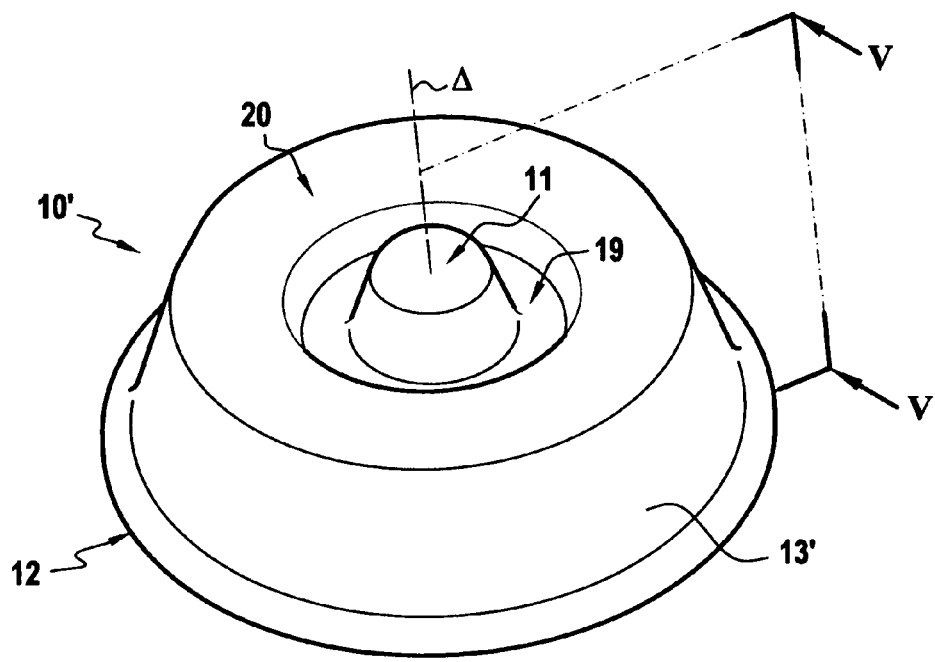
FIG. 3 shows a connection element suitable for use in a second assembly in accordance with the invention.

It should be observed that in FIGS. 3 and 5, the undulations 19 and 20 are shown as being substantially flat, however they could equally well have other shapes, for example they could be sinusoidal.

Considerations of size, bulk, and proportion similar to those mentioned for the connection element shown in FIG. 1 apply likewise to the element of FIG. 3.

It should be observed that changes in the thickness of the stamped sheet, radii of curvature r1, r2, r3, r4, r5, and r6 of the undulations, dimensions l1, l2 of the undulations, heights h1, h2, and h3 characterizing the undulations 19 and 20, angles alp1, alp2, and alp3 between the undulations and the perpendicular to the flat zones, and sizes l0, l3 of said flat zones are all to be envisaged and constitute as many parameters for refining the stresses and the stiffness properties of the element.

In the embodiments of FIGS. 1 and 3, the rigidity of the resulting assembly in shear presents the advantage of being isotropic in the assembly plane.

The shear stresses observed at the brazed joints in an assembly using a connection element having the characteristics shown in FIG. 3 are smaller than those observed in an assembly using a connection element as shown in FIG. 1.

the dimensions l1, l2 of the undulations, the heights h1, h2, and h3 of the undulations, the angles alp1, alp2, and alp3 made by the undulations relative to the perpendicular to the flat zones, and the dimensions l0, l3 of the flat zones.

The three heights h1, h2, h3 characterize the two free undulations 19 and 20 of the deformable zone 13'. These first, second, and third heights h1, h2, h3 correspond, as shown in FIG. 5, to the heights of the portions of the tape that are substantially rectilinear in profile extending respectively between the first flat zone 11 and the bottom of the undulation 19, between the bottom of the undulation 19 and the top of the undulation 20, and between the top of the undulation 20 and the second flat zone 12.

The person skilled in the art will understand that the height h2 is selected to be less than or equal to the height h1.

Nevertheless, it is advantageous also to take account of the minimum radii of curvature for the free undulations. The value of h2 is then advantageously selected to be greater than or equal to ⅓ of h1.

In the example described herein, the values that have been selected and that are proposed are limited to a few tenths of a millimeter since it is required that the connection between the assembled pieces should not exceed 2 mm. That said, the greater h1 and h2, the more the deformations are spread and the lower the stresses.

The table below shows an example of a set of geometrical parameters suitable for obtaining a good compromise between maximum stress and rigidity with an alloy tape made of Inconel 718™.

| e | h1 | h2 | h3 | alp1-alp3 | l1-l3 | r1-r6 | l0 |
|---|---|---|---|---|---|---|---|
| 0.4 mm | 0.3 mm | 0.1 mm | 0.3 mm | 5° | 0.5 mm | 0.75 mm | 1.0 mm |

Figure 4:
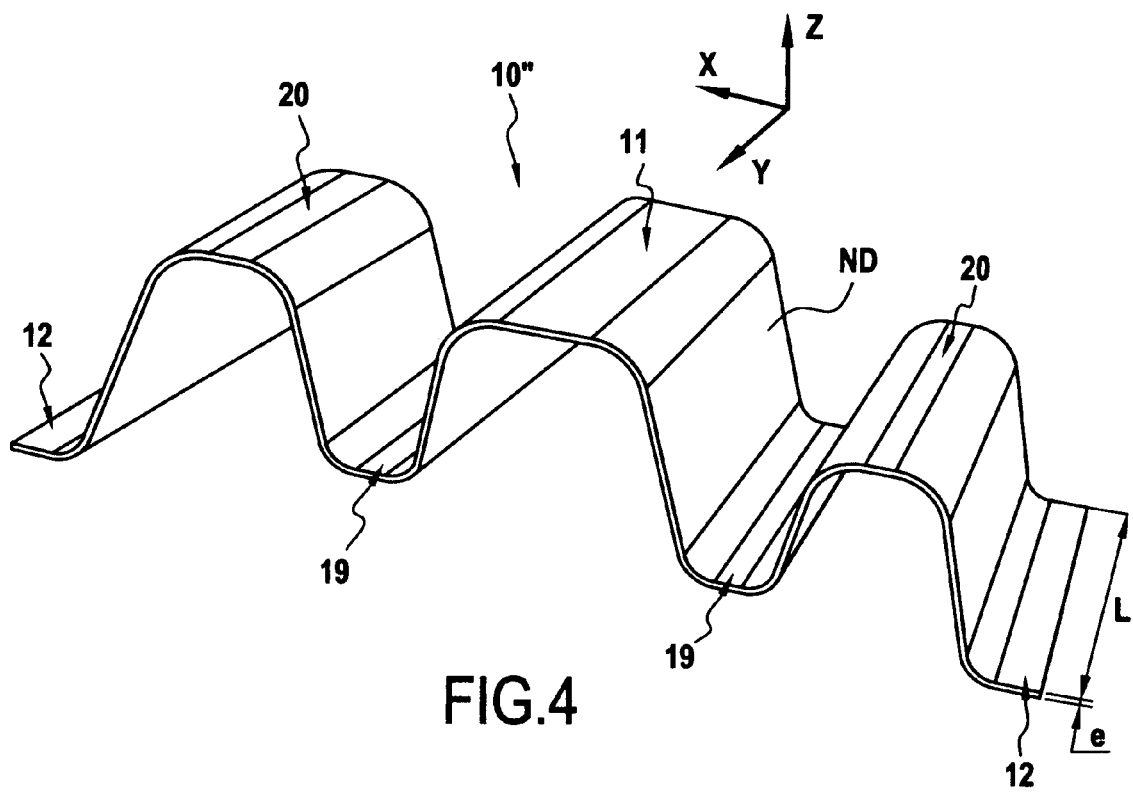
FIG. 4 shows a connection element suitable for use in a third assembly in accordance with the invention.
Figure 6:
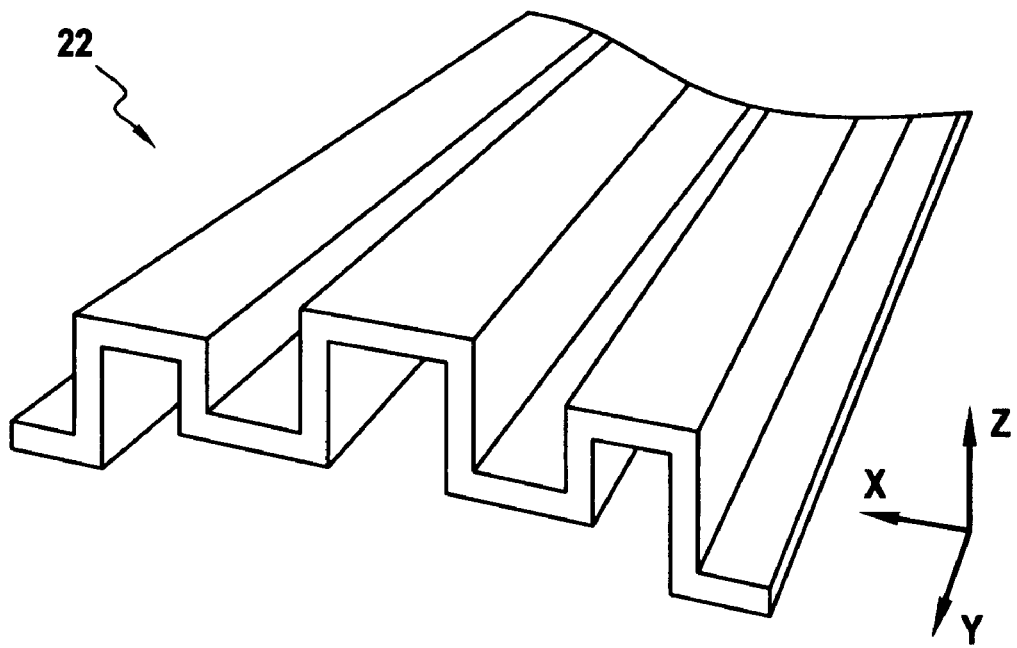
FIG. 6 shows an undulating surface from which intermediate connection elements of the kind shown in FIG. 5 are obtained.

FIG. 4 shows a connection element 10" that can be used in another assembly in accordance with the invention. In this embodiment, the connection element 10" is generally in the form of a concertina-folded tape. In the example shown in FIG. 4, the section of the tape is the same as that shown in FIG. 5. Such a connection element could also be a stamped structure or could advantageously be obtained by folding, or by extrusion in a straight line along the direction Y. If extruded, and as shown in FIG. 6, an undulating surface 22 is obtained with corrugations that extend along the direction Y.

The connection elements 10" are then cut once every L millimeters from said undulating surface 22.

It is also possible to envisage machining a piece made of metal such as Inconel 718, e.g. by wire machining.

The intermediate element 10" in this embodiment has a preferred direction for deformation constituted by the direction X (tangential rigidity) and a rigid direction constituted by the direction Y (transverse rigidity).

The stresses observed in the brazed joints in this embodiment are low. The resulting assembly then presents lower rigidity than that observed in the other embodiments based on an axially symmetrical connection element 10 or 10', as shown in FIGS. 1 and 3.

The geometrical parameters of the tape can be modified in order to obtain the lowest maximum stress in the brazed joints and in the structure itself for the lowest tangential rigidity (i.e. in the direction X), and the highest normal rigidity (in the direction Z).

Figure 7:
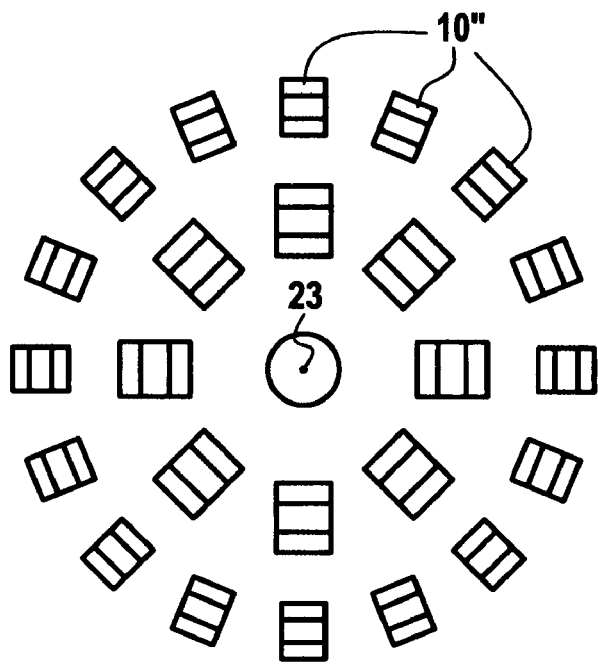
FIG. 7 shows an advantageous embodiment of the invention.

Thus, it is possible to modify the thickness e of the tape, the radii of curvature r1, r2, r3, r4, r5, and r6 of the undulations, To increase rigidity in shear parallel to the assembly plane, a plurality of intermediate connection elements 10" are disposed radially around a fixed point 23, as shown in FIG. 7.

In this embodiment, the deformable sheets are directed towards the fixed point 23. By placing the connection elements 10" in concentric manner, zero relative displacement is forced between the assembled pieces for the central point 23 of the concentric arrangement. This stiffens the assembly in the assembly plane. The intermediate elements 10" can be placed in such a manner that their own deformation directions point towards the fixed point 23.

This disposition mitigates the lack of rigidity in the tangential direction. Relative deformation during cooling of the two pieces to be assembled together is then oriented towards the center of the assembly, which is the fixed point 23, so there is no relative movement between the two pieces that are to be assembled. The deformation due to differential expansion is then absorbed concentrically. Overall rigidity is obtained because of the greater rigidity of the structures in the direction perpendicular to the preferred deformation direction.

In addition, given that the relative displacement between the pieces for assembly is zero at the fixed point and that it increases out to the periphery, it is advantageous to make use of structures of increasingly flexibility on going away from the fixed point. This serves to improve tangential rigidity in the region of the fixed point.

Figure 8:
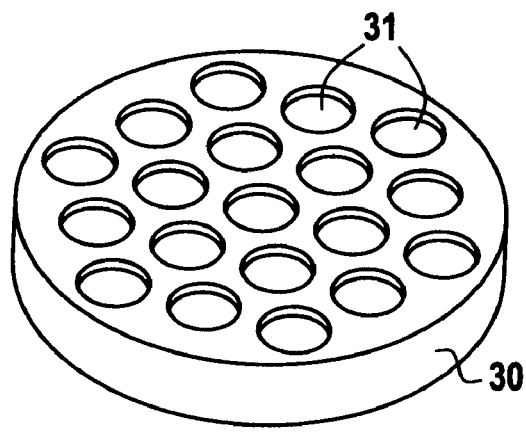
FIG. 8 shows a particular embodiment of a piece having openings formed therein to facilitate positioning and anchoring connection elements for assembly in accordance with the invention.

FIG. 8 shows a particular embodiment of an assembly piece 30 having openings or cavities 31 formed therein for the purpose of positioning intermediate connection elements 10" in a star configuration corresponding to that shown in FIG. 7.

This arrangement enables the intermediate connection elements 10″ to be anchored in the piece 30 which is preferably the metal piece, or possibly the piece made of ceramic material.

Implementing the invention requires the intermediate elements to be made of a material that is selected to remain within its elastic domain. It is also important to fabricate the intermediate connection elements out of a material that is as strong as possible in order to have greater latitude in mechanical weakening, i.e. improved flexibility.

Figure 9A:
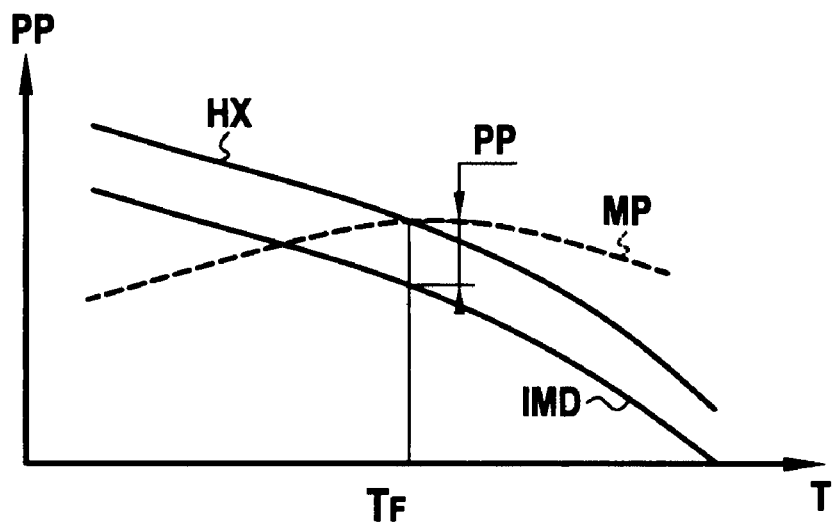
FIGS. 9A and 9B are curves showing mechanical properties as a function of temperature for materials suitable for use in making intermediate elements, respectively elements that are ductile and elements that are reversibly deformable.
Figure 9B:
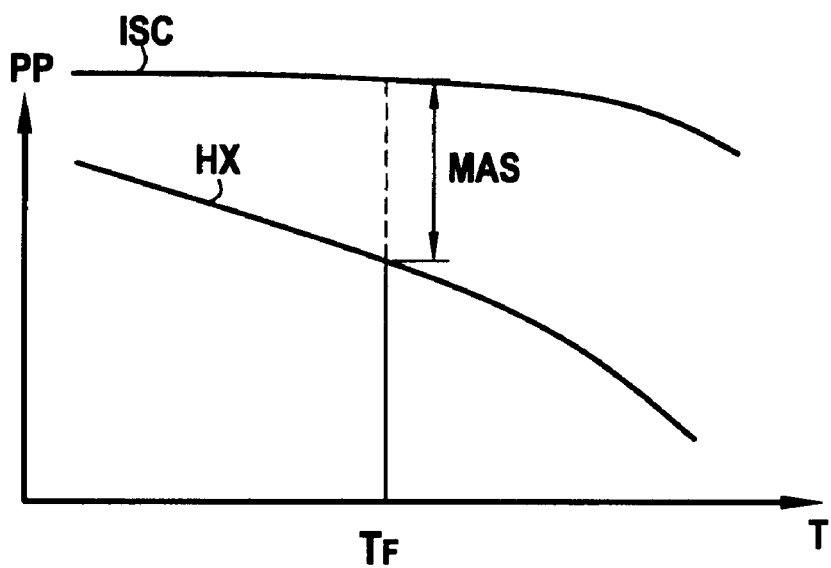

FIGS. 9A and 9B show properties that need to be taken into account when selecting the material for the intermediate element. In FIG. 9A, curve IMD representing the mechanical properties of an intermediate connection element that is solid and ductile is given for comparison with the curve HX for the metal piece that is to be assembled. A loss in mechanical properties PP (elastic limit, rupture strength) can be observed.

The curve MP represents the potentially ideal mechanical properties of an intermediate connection element for brazing at a temperature $T_S$ corresponding to the solidification temperature of the brazing compound.

Below the solidification temperature $T_S$, the intermediate element should ideally have mechanical properties that are weaker than those of the metal piece for assembly (HX) so as to enable it to act as a ductile material. It also needs to have mechanical strength properties that are at least sufficient at an operating temperature $T_F$, where the operating temperature $T_F$ is empirically about ⅔ of the above-mentioned solidification temperature $T_S$, in degrees Celsius, which can be written as follows:

$$T_S = \frac{3}{2} T_F$$

where $T_S$ and $T_F$ are expressed in degrees Celsius.

However, the person skilled in the art knows that these requirements, represented by the curve MP cannot be achieved with an intermediate element that is solid and ductile. To mitigate the loss of property PP observed with such a material, it is necessary for the assembly to be overdimensioned.

FIG. 9B shows a curve ISC for the mechanical properties of a material for a deformable intermediate connection element that is advantageously suitable for use in the invention. This curve corresponds to a highly refractory material (e.g. alloys based on iron, nickel, chromium, aluminum, titanium) having mechanical properties that degrade little at high operating temperature.

Instead of observing a loss of property PP as in FIG. 9A, there can be seen a structural weakening margin MAS. This margin is controllable and used for adjusting the flexibility of the structure at will.

The deformable intermediate connection elements may also be in the form of a one-dimensional (1D) undulating sheet, a stamped sheet, or indeed a sheet with corrugations crossing in two dimensions (2D).

By way of example, materials for making these structures can be selected from the following list: 1D undulating sheet of alloy based on FeCrAlY; 2D corrugated sheet of Haynes 230 (stamped sheet); crossed 2D corrugated sheets of Nimonic 75 (one-dimensional corrugated tape inserted and brazed in the corrugation recesses of a one-dimensional corrugated sheet, embodiment not shown).

Such structures can be used in particular for assembling parts made of ceramic material based on SiC with metal parts based on Inconel 718 or TA6V alloy, this list not being limiting.

The invention claimed is:

1. An assembly comprising:
   a metal piece;
   a piece made of ceramic material; and
   at least one intermediate connection element sandwiched between and assembled to each of the metal piece and piece made of ceramic material by brazing, the intermediate connection element including a deformable sheet including at least two flat zones brazed respectively to the metal piece and the piece made of ceramic material, the two flat zones being interconnected by a deformable zone including at least two free undulations oriented in alternation towards the metal piece and towards the piece made of ceramic material, the two free undulations not contacting either of the metal piece or the piece made of ceramic material.

2. An assembly according to claim 1, wherein the piece made of ceramic material includes a base of silicon carbide and/or carbon.

3. An assembly according to claim 2, wherein the piece made of ceramic material includes a ceramic matrix reinforced by silicon carbide or carbon fibers.

4. An assembly according to claim 2, wherein the piece made of ceramic material is made of solid silicon carbide.

5. An assembly according to claim 1, wherein the deformable zone includes two free undulations having first, second, and third heights, the heights being such that the value of the second height is greater than or equal to ⅓ of the value of the first height.

6. An assembly according to claim 1, wherein the free undulations are concentric.

7. An assembly according to claim 1, wherein the intermediate connection element includes a first flat zone that is substantially circular about an axis, a second flat zone that is substantially annular, coaxial about the first zone, and has an inside diameter greater than a diameter of the first zone, and three undulations having symmetry of revolution about the axis.

8. An assembly according to claim 1, wherein the intermediate connection element is a form of a tape that is concertina-folded in a main direction.

9. An assembly according to claim 8, wherein a plurality of intermediate connection elements are arranged radially around a fixed point.

10. An assembly according to claim 9, wherein the plurality of intermediate connection elements are such that the intermediate elements are of increasing flexibility in a direction moving away from the fixed point.

11. An assembly according to claim 9, wherein the plurality of intermediate connection elements are arranged such that main directions thereof are in alignment on a plurality of radial directions about the fixed point.

12. An assembly according to claim 11, wherein the plurality of intermediate connection elements are such that the intermediate elements are of increasing flexibility in a direction moving away from the fixed point.

13. A turbomachine comprising at least one assembly according to claim 1.

14. A turbomachine according to claim 13, further comprising a nozzle, wherein the metal piece is a casing of the nozzle and the piece made of ceramic material is a flap of the nozzle.

15. A turbomachine according to claim 13, further comprising a combustion chamber, wherein the metal piece is a casing of the combustion chamber and the piece made of ceramic material is a component part of the combustion chamber.

16. A turbomachine according to claim 13, further comprising a post-combustion equipment, wherein the metal piece is a post-combustion casing and the piece of ceramic material is a flame-holder arm.

17. An assembly according to claim 1, wherein the free undulations are not attached to the metal piece or the piece of ceramic material.

18. An assembly according to claim 1, wherein the flat zones have a plateau shape.

19. An assembly according to claim 1, wherein the flat zones are flat across a non-zero length.

\* \* \* \* \*